United States Patent [19]

Peterson et al.

[11] Patent Number: 4,751,845
[45] Date of Patent: Jun. 21, 1988

[54] DIPSTICK ASSEMBLY

[75] Inventors: Vern Peterson, Simpsonville, S.C.; Gregory Kosmowski, Milford, Mich.

[73] Assignee: Lucas Industries, Birmingham, England

[21] Appl. No.: 874,070

[22] Filed: Jun. 13, 1986

[30] Foreign Application Priority Data

Jun. 22, 1985 [GB] United Kingdom ................. 8515848

[51] Int. Cl.$^4$ ...................... G01F 23/04; G01F 23/22; G08B 21/00
[52] U.S. Cl. ......................... 73/298; 73/295; 73/291; 340/618; 340/59; 33/126.7 R
[58] Field of Search ................. 73/291, 294, 295, 298, 73/290 R; 33/126.7 R, 126.7 A; 340/618, 620, 622, 59, 621, 619, 623, 624; 116/109, 110, 111, 227

[56] References Cited

U.S. PATENT DOCUMENTS

| 2,728,070 | 12/1955 | Kelly | 73/298 |
| 2,780,692 | 2/1957 | Hinojosa | 340/59 |
| 2,855,582 | 10/1958 | Tweedale | 340/59 |
| 3,098,914 | 7/1963 | Giannino | 340/622 |
| 3,742,245 | 6/1973 | Hallen et al. | 73/295 |
| 3,918,018 | 11/1975 | Tuley et al. | 340/618 |
| 4,034,608 | 7/1977 | Vincent | 340/59 |
| 4,322,713 | 3/1982 | Duck et al. | 340/620 |
| 4,572,097 | 2/1986 | Chapelsky | 340/59 |
| 4,654,646 | 3/1987 | Charboneau | 340/622 |

FOREIGN PATENT DOCUMENTS 1064954 5/1954 France ...................... 340/59

Primary Examiner—William A. Cuchlinski, Jr.
Assistant Examiner—Thomas B. Will
Attorney, Agent, or Firm—Holman & Stern

[57] ABSTRACT

A dipstick assembly for an internal combustion engine comprises a first tube arranged to extend from an engine sump and housing a conventional dipstick, a second tube secured about a portion of the first tube and extending within the sump and a sensor at the end of the second tube remote from the first tube. Between the sensor and the first tube, the second tube is deformed so as to lie substantially on one side of the dipstick and the deformed portion of the second tube accommodates electrical connections to the sensor.

4 Claims, 1 Drawing Sheet

DIPSTICK ASSEMBLY

BACKGROUND OF tHE INVENTION

1. Field of The Invention

This invention relates to a dipstick assembly for use with an internal combustion engine to enable the lubricant level in the sump of the engine to be checked.

2. Description of the Prior Art

A conventional dipstick assembly comprises a dipstick formed from strip metal which is located in a tube mounted on and extending from the sump of the engine. The end portion of the dipstick extends into the lubricant and by withdrawing the dipstick from the tube it is possible to assess the lubricant level, the end portion of the dipstick being graduated for this purpose.

The checking of the lubricant level requires a conscious effort on the part of the vehicle operator and even if the vehicle operator checks the lubricant level at regular intervals, a sudden reduction of the level of lubricant may escape the attention of the operator. The reduction in lubricant level may result in damage to the engine. It is known to provide a sensor which can provide in conjunction with external electrical components, a signal when the level of lubricant falls to a dangerous level. Such a sensor is known which is built into the engine structure. This form of sensor is expensive and may require considerable effort to secure it to the engine as an accessory. Another form of sensor is known which replaces the conventional dipstick. This form of sensor requires electrical leads of substantial length to enable the sensor to be withdrawn from the tube in order to assess the lubricant level in the engine sump, in the usual way. The presence of long electrical leads is undesirable. Another version utilizes surface contacts on the handle of the dipstick which co-operate with contacts at the upper end of the tube. This version is prone to contamination of the contacts by dirt.

BRIEF SUMMARY OF THE INVENTION

The object of the present invention is to provide a dipstick assembly in a simple and convenient form.

According to the invention a dipstick assembly for the purpose specified comprises a tube arranged in use to extend from the engine sump and housing a conventional dipstick which extends into the sump, an elongated mounting member secured to the tube and extending in use into the sump, a sensor mounted on said elongated mounting member, said sensor being responsive to the lubricant level within the sump, the mounting member extending alongside the dipstick so as to allow free access of the engine lubricant to the dipstick, and electrical connections to said sensor, said connections extending along said mounting member to a position exterior of the sump.

BRIEF DESCRIPTION OF THE DRAWINGS

An example of a dipstick assembly in accordance with the invention will now be described with reference to the accompanying drawings wherein.

DETAILED DESCRIPTION

Figure 1:
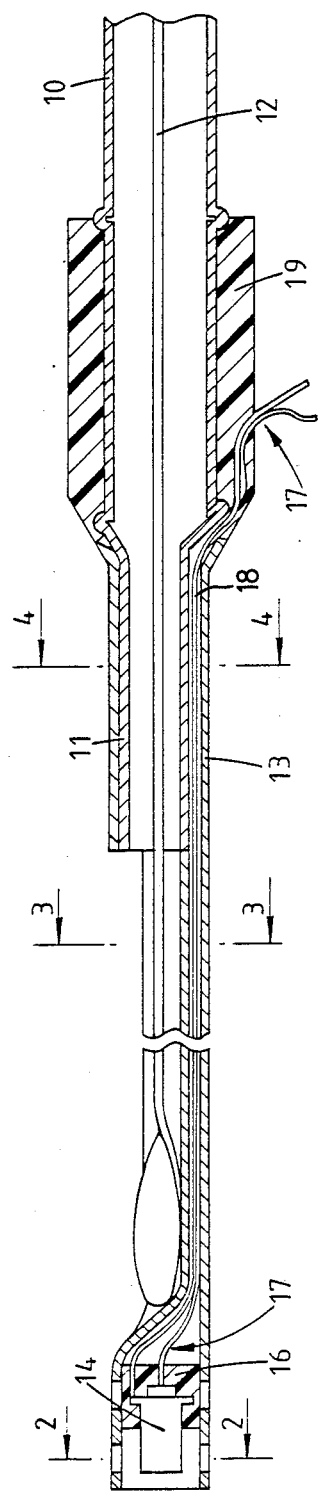
FIG. 1 is a longitudinal cross-sectional view of the complete dipstick assembly of the invention.

Referring to the drawings, the dipstick assembly comprises a first tube 10 which at its end nearer to the sump of the engine, defines a reduced diameter portion 11. Extending within the tube 10 is a conventional dipstick 12 which extends beyond the reduced portion 11 of the tube 10, into the engine sump.

Figure 3:
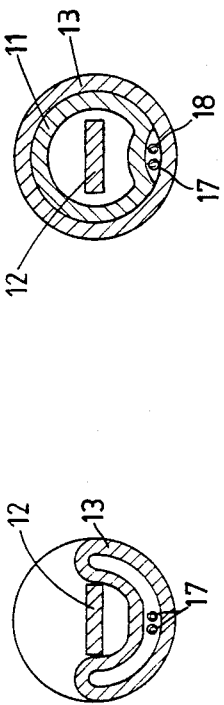
FIGS. 2, 3 and 4 are cross-sectional views, respectively, taken along the lines 2—2, 3—3, 4—4 of FIG. 1.
Figure 4:
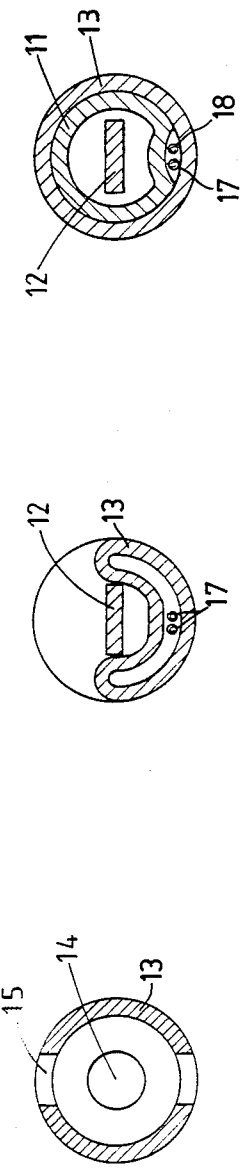
Figure 2:

Also forming part of the dipstick assembly is an elongated mounting member which is secured to the tube 10. In the example the mounting member is formed by a tube 13 which is engaged about the reduced portion 11 of the tube 10. Beyond the end of the portion 11 however the tube 13 is squashed to the cross-sectional shape shown in FIG. 3, whereby it lies substantially completely on one side of the dipstick 12. At its end remote from the tube 10, the tube 13 regains its tubular form and serves as a housing for a sensor 14. The section of the tube 13 in the region of the sensor is shown in FIG. 2 and it will be seen to define apertures 15 whereby the engine lubricant can gain ready access to the sensor 14. Conveniently the sensor 14 is mounted upon an electrically insulating support 16 which is secured within the tube 13 and electrical connections 17 to the sensor extend through the support. The connections 17 pass within the squashed portion of the tube 13 as shown in FIG. 3 and then pass into a recess 18 formed by deforming the wall of the reduced diameter portion 11 of the first tube 10, as shown in FIG. 4, the recess being closed by the wall of the tube 13. From recess 18 the connections 17 pass to the exterior of the dipstick assembly at a position which will be exterior of the engine sump. Loose connections as illustrated may be provided and pass partly through an encapsulating sleeve 19. Alternatively, blade connectors may be provided which can be molded into the encapsulating sleeve 19, the sleeve being formed from electrically insulating material.

In the example illustrated the end of the dipstick 12 lies behind the sensor 14. In some instances it may be desirable to allow the dipstick to project beyond the sensor. If the dipstick 12 in the illustrated example is extended, it will deform as it is pushed past the end portion of the tube 13 housing the sensor 14. In an alternative arrangement the tube 13 is bent so that no deformation of the dipstick takes place as it is passed through the tube.

By the arrangements described the dipstick assembly can be inserted into an existing aperture in a sump after removing the tube of the conventional dipstick assembly and electrical connections can be made to the sensor so that when the oil level in the sump falls to a dangerous level as detected by the sensor, an electrical signal will be given to the operator. The conventional dipstick can still be used by the operator to assess the true level of the lubricant in the engine sump.

We claim:

1. A dipstick assembly for use with an internal combustion engine for detecting the level of lubricant in a sump of the engine comprising:

a tube extending from the sump;

a dipstick extending through said tube into the sump;

an elongated mounting member formed from tubular material having one end portion engaged about a portion of said tube and another end portion remote from said tube defining a housing;

an electrical sensor mounted in said housing and being responsive to the level of lubricant in the sump;

a deformed intermediate portion on said mounting member between said end portions thereof and located substantially on one side of said dipstick;

a deformed port on said portion of said tube within said one end portion of said mounting member defining a recess between said portions of said tube and mounting member; and electrical connections connected to said sensor and extending within said deformed intermediate portion of said mounting member and through said recess to the exterior of the assembly.

2. A dipstick assembly as claimed in claim 1 and further comprising:

an electrically insulating support mounted within said housing; and said sensor being mounted in said housing by said support.

3. A dipstick assembly as claimed in claim 1 and further comprising:

apertures in said housing for allowing access of lubricant in the sump to said sensor.

4. A dipstick assembly as claimed in claim 2 and further comprising:

apertures in said housing for allowing access of lubricant in the sump to said sensor.

* * * * *